(12) United States Patent
Behrens

(10) Patent No.: US 8,012,558 B2
(45) Date of Patent: Sep. 6, 2011

(54) RELEASE AGENT BASED ON ETHYLENE MULTI-BLOCK COPOLYMER

(75) Inventor: Nicole Behrens, Hamburg (DE)

(73) Assignee: tesa SE, Hamburg (DE)

( * ) Notice: Subject to any disclaimer, the term of this patent is extended or adjusted under 35 U.S.C. 154(b) by 314 days.

(21) Appl. No.: 12/190,194

(22) Filed: Aug. 12, 2008

(65) Prior Publication Data

US 2009/0047459 A1 Feb. 19, 2009

(30) Foreign Application Priority Data

Aug. 13, 2007 (DE) .......................... 10 2007 038 239

(51) Int. Cl.
*B32B 33/00* (2006.01)
*C08L 53/00* (2006.01)

(52) U.S. Cl. ...................... 428/41.3; 428/40.1; 428/41.8; 428/343; 428/355 AC; 428/523; 525/240; 525/242; 525/319; 525/320; 525/321; 525/324

(58) Field of Classification Search .......................... None
See application file for complete search history.

(56) References Cited

U.S. PATENT DOCUMENTS

| | | | |
|---|---|---|---|
| 5,728,469 A * | 3/1998 | Mann et al. .................. 428/41.8 |
| 5,919,983 A | 7/1999 | Rosen et al. |
| 5,948,517 A | 9/1999 | Adamko et al. |
| 6,218,006 B1 * | 4/2001 | Tokunaga et al. ........ 428/355 AC |
| 2004/0127121 A1 * | 7/2004 | Schwab et al. ................... 442/46 |
| 2004/0134607 A1 * | 7/2004 | Ryan et al. .................. 156/331.4 |
| 2005/0048302 A1 * | 3/2005 | Sakurai et al. ................. 428/500 |
| 2005/0266256 A1 * | 12/2005 | Yamamoto et al. ........... 428/523 |
| 2006/0199912 A1 * | 9/2006 | Fuchs et al. .................... 525/240 |

FOREIGN PATENT DOCUMENTS

| | | |
|---|---|---|
| EP | 0742814 A | 11/1996 |
| GB | 676559 A | 7/1952 |
| JP | 2008-080626 A | 4/2008 |
| WO | 2005090427 A1 | 9/2005 |

OTHER PUBLICATIONS

English Language Abstract for JP 2008-080626 A.

* cited by examiner

*Primary Examiner* — Patricia L Nordmeyer
*Assistant Examiner* — Jeff A Vonch
(74) *Attorney, Agent, or Firm* — Norris McLaughlin

(57) ABSTRACT

Release agent more particularly for an adhesive with an ethylene multi-block copolymer, the ethylene multi-block copolymer being composed of hard segment blocks, comprising at least 95% (w/w) ethylene and a comonomer, and of soft segment blocks, comprising ethylene and a comonomer, the fraction of comonomer in the soft segment blocks being between 10 and 20 mol %, and the fraction of the hard segment blocks in the ethylene multi-block copolymer being not more than 45% (w/w).

11 Claims, No Drawings

RELEASE AGENT BASED ON ETHYLENE MULTI-BLOCK COPOLYMER

The invention relates to a release agent based on ethylene multi-block copolymer and also to the use of the release agent more particularly in an adhesive tape.

Release agents are solids or liquids which lower the forces of adhesion between two adjacent surfaces (for example moulding/mould), in other words prevent them from sticking, by forming a readily separable film between the two surfaces (adhesive agent).

Siliconized release papers and release films for use in conjunction with acrylate and rubber adhesives are well established and find broad application. A disadvantage, however, is the risk of transfer of the silicon to surfaces, which consequently are a poor adhesion base for bonding agents and paints. Moreover, siliconization requires the coating of the release paper/film and subsequent crosslinking of that coating.

A functional layer which can be applied as a coextruded layer in the course of the production of a release film would save on work steps and is therefore to be preferred over siliconization. Coextrusion can be carried out easily in particular with polyolefins. Accordingly the use of a polyolefin as a functional layer with release effect would be a very attractive alternative to siliconization, but to date has been possible only to a very limited extent.

The use of a polyethylene release film for acrylate and rubber adhesives is described by GB 676,559 A. The only polyethylene available commercially at the time of the application was a low-density polyethylene with densities between approximately 0.915 and 0.935 g/cm³. Polyethylene release films of this kind are suitable for straight acrylate adhesives with high glass transition temperature, but exhibit distinct weaknesses in conjunction with resin-blended acrylate and rubber adhesives. After prolonged storage, in particular, the release forces between release film and adhesive are too high.

A release film having a maximum release force of 0.39 N/cm and comprising linear polyethylene with densities between 0.865 and 0.900 g/cm³ and with a polydispersity below 5.0 is described in U.S. Pat. No. 5,948,517 A1. Although the disclosure is not confined to particular adhesives, the limitation on the release force means that only selected acrylate adhesives can be used. Strong acrylate adhesives easily attain release forces of up to 2 N/cm on linear polyethylene in the density range defined in the disclosure. For rubber adhesives, the use of polyethylene release films is even less suitable.

The use of linear polyethylenes with densities of not more than 0.90 g/cm³ as release film for acrylate adhesives is described in EP 0 742 814 A1. The disclosure is confined to linear polyethylenes in conjunction with acrylate adhesives, the polyethylenes being random copolymers of α-olefin and ethylene. In general the α-olefin used is 1-butene or 1-octene. As the α-olefin fraction rises, the density of the polymer falls, since the randomly incorporated α-olefins disrupt the crystallization of the polyethylene. The lower the density, the smaller the release force that need be applied in order to separate release film from adhesive. A drop in density, however, is generally also accompanied by a drop in melting point. Particularly if release films are stored in conjunction with adhesives for a prolonged period under climatic conditions which are often not monitored, melting points of the release film comprising the EXACT 4006 polyethylene type used in EP 0 742 814 A1 of 60° C. are unacceptable. A release film of this kind can in practice be used only in exceptional cases, since the polyethylene may melt and the rolls of adhesive tape may suffer blocking.

The polyethylenes described in EP 0 742 814 A1, with densities of not more than 0.90 g/cm³, may be used not only in release films but also, of course, as the outer layer of a pressure-sensitive adhesive tape, in order to reduce the adhesion of the acrylate adhesive to the reverse face of the adhesive tape. In this application, however, the low melting point of these polyethylenes is a great disadvantage.

An ethylene multi-block copolymer, also referred to as OBC (Olefin Block Copolymer) is described by WO 2005/090427 A1. This multi-block copolymer is obtained from the polymerization of two olefins in the presence of two polymerization catalysts that differ in their selectivity for the two olefins, and also of a chain transfer reagent (chain shuttling agent).

Within the multi-block copolymer there are structurally different blocks of the copolymer. Some of the blocks, like that in EP 0 742 814 A1, are composed of α-olefin-ethylene copolymers, albeit with a very high α-olefin fraction. The others contain only a very small α-olefin fraction, and as a result of this it is possible for the polyethylene from these blocks of the copolymer to undergo crystallization. As a result of these crystallites, the melting point of the multi-block copolymer is situated at significantly higher temperatures than the melting point of random copolymers of identical monomers.

It is an object of the invention, therefore, to provide a release agent, more particularly for single-sided adhesive tape, which can still be separated easily following prolonged storage in contact with an acrylate or silicone adhesive (up to two years at temperatures of up to 80° C.).

This object is achieved by means of a release agent as specified in the main claim. The dependent claims provide advantageous developments of the subject matter of the invention. The invention further provides proposed uses of the release agent of the invention.

The invention accordingly provides a release agent more particularly for an adhesive with an ethylene multi-block copolymer, the ethylene multi-block copolymer being composed of hard segment blocks, comprising at least 95% (w/w) ethylene and a comonomer, and of soft segment blocks, comprising ethylene and a comonomer, the fraction of comonomer in the soft segment blocks being between 10 and 20 mol %, and the fraction of the hard segment blocks in the ethylene multi-block copolymer being not more than 45% (w/w).

According to one first advantageous embodiment of the invention the hard segment blocks have a crystallite melting point of at least 110° C.

According to another advantageous embodiment of the invention the ethylene multi-block copolymers are prepared by chain-shuttling polymerization.

In chain-shuttling polymerization two different catalysts are used which build up different polymer structures. The transfer of the polymer chain from one catalyst to the other produces multi-block copolymers composed of segments having different microstructures (for example semicrystalline (hard)/amorphous (soft)). The segments differ in their chemical structure as a result of a high fraction (in the hard segment) or low fraction (in the soft segment) of polyethylene in the polymer.

The comonomer, whose fraction in the soft segment is between 10 and 20 mol %, preferably between 15 and 17 mol %, is 1-octene. The use of propylene, 1-butene, 1-pentene, 4-methyl-1-pentene, 1-hexene, 1-heptene, 1-decene, vinyl acetate, 1-methylvinyl acetate and similar monomers is likewise possible.

The copolymerization of the comonomer produces low-density amorphous segments.

The operation uses a catalyst 1 which produces a hard, semicrystalline polyolefin from an ethene/higher α-olefin (1-octene) mixture, in other words having a high rate of incorporation for ethene and a low rate of incorporation for 1-octene.

Additionally used is a catalyst 2 which possesses a heightened 1-octene selectivity, and which synthesizes an amorphous soft polymer from the same mixture.

As well as the catalysts 1 and 2 there is also a chain transfer reagent present that ensures reversible transfer of the polymer chains between the catalysts. The resulting product is the above-described multi-block copolymer with adjustable fractions of hard segments and soft segments.

As catalyst 1 and catalyst 2 it is possible to make use, for example, of [N-(2,6-di(1-methylethyl)phenyl)amido](2-isopropylphenyl)(α-naphthalene-2-diyl(6-pyridine-2-diyl)-methane)]hafnium dimethyl and 1,2-bis(3,5-di-t-butylphenylene)(1-(N-(1-methyl-ethyl)immino)methyl)(2-oxoyl) zirconium dibenzyl or [N-(2,6-di(1-methyl-ethyl)phenyl)amido](2-isopropylphenyl)(α-naphthalene-2-diyl(6-pyridine-2-diyl)-methane)]hafnium dimethyl and 1,2-bis-(3,5-di-t-butylphenylene)(1-(N-(2-methyl-cyclohexyl)immino) methyl)(2-oxoyl)zirconium dibenzyl, in each case for example with diethylzinc as chain transfer reagent.

To lower the release force between layer of adhesive and outer layer of the adhesive tape, or of a release film, it is advantageous if the ethylene multi-block copolymer present in the outer layer possesses a hard segment fraction of not more than 45% (w/w), preferably 35% (w/w). Ethylene multi-block copolymers with a higher hard segment fraction exhibit an increased release force with respect to the adhesive and are therefore not suitable for the application.

On account of the presence of the crystalline regions, a person skilled in the art would have been dissuaded from using the multi-block copolymer in a release agent, since an increased crystallinity correlates with poor properties as a release agent in relation to acrylate adhesives.

The release agent of the invention can be used with preference in the form of a coherent layer, more particularly in the form of a film, in which case it is also called a release film. According to one preferred embodiment of the invention the layer is composed to an extent of at least 70% by weight of the release agent. By adding a further polyolefin it is possible to modify the release effect of the layer. In order to obtain a low release effect, a blend with up to 30% by weight of a polyethylene or polypropylene is preferred.

The release film may have a single-layer or else a multi-layer construction, by virtue of the application of further layers to the release agent layer.

It is preferred, furthermore, if the release agent is used as a coherent layer on the open reverse face of a carrier material provided on one side with an adhesive.

In that case the carrier material of the adhesive tape is composed preferably of at least two layers, namely the carrier film itself and the release agent layer applied to it. Particular preference is given to carrier materials which are produced by coextrusion of the two film layers, meaning that no additional step is necessary for the lamination of individual film layers.

The layer of release agent comprising ethylene multi-block copolymer ought preferably to possess a thickness of not more than 20 μm, with further preference not more than 10 μm. The use of thicker film layers or release films composed of the multi-block copolymer is not a disadvantage in relation to the release effect. The reason for the preferred use of layers not more than 20 μm in thickness, rather, is the optimization of the price of the end product.

Where the ethylene multi-block copolymer is used as an external release agent layer in a multi-layer carrier material, the adjacent film layer, according to one further advantageous embodiment of the invention, is composed to an extent of at least 50% (w/w) of homo-, co-, or terpolymer of polyethylene, polypropylene and/or polybutylene. On coextrusion of these polymers and the multi-block copolymer, the adhesion between the two is so great that even under load there is no splitting of the individual layers from one another.

Where a layer of adhesion promoter is used between external multi-block copolymer layer and the adjacent film layer, the multi-block copolymer can also be used in conjunction with other polymers in the adjacent layer.

If the release agent is used as a coherent layer on the open reverse face of a carrier material provided on one side with an adhesive, a layer of adhesive, more particularly a layer of pressure-sensitive adhesive, is applied to the carrier material. The layer of adhesive disposed on the carrier layer is preferably a layer of acrylate or silicone adhesive.

For adhesive tape application the carrier material is coated on one side with the preferred pressure-sensitive adhesive as a solution or dispersion or in 100% form (melt, for example) or by coextrusion with the film. An alternative option is that of coating by transfer of a layer of adhesive, by lamination, and yet, in contradistinction to the conventional polyethylene films, such an operation is not mandatory. The adhesive layer or layers can be crosslinked by heat or high-energy radiation and if necessary can be lined with release film or release paper.

In order to optimize the properties it is possible with preference for the self-adhesive composition employed to be blended with one or more additives such as tackifiers (resins), plasticizers, fillers, pigments, UV absorbers, light stabilizers, ageing inhibitors, crosslinking agents, crosslinking promoters or elastomers.

An advantageous operation is a physical pre-treatment of the side of the carrier film intended for coating with pressure-sensitive adhesive, for the purpose of promoting the adhesion, by means of flame, plasma or corona treatment.

Where necessary, the application of the layer of pressure-sensitive adhesive can be preceded by the application of a primer layer, which is applied, more particularly, solventlessly such as, for example, by coextrusion, so that there is a primer layer located between the carrier film layer and a layer of pressure-sensitive adhesive.

The amount of the adhesive layer is preferably 10 to 120 g/m$^2$, preferably 25 to 100 g/m$^2$ (the reference is to the amount after any necessary removal of water or solvent; the numerical values also correspond approximately to the thickness in μm).

With particular preference the pressure-sensitive adhesive to be used for the one-sided treatment of the carrier material is a polyacrylate pressure-sensitive adhesive which comprises a polymer comprising in relation to the polymer 79% to 100% by weight of acrylic esters and/or methacrylic esters and/or the associated free acids with the formula $CH_2=C(R^3)(COOR^4)$, where $R^3$ is H or $CH_3$ and $R^4$ is H or alkyl chains having 1 to 30 C atoms, and 0% to 30% by weight of olefinically unsaturated monomers with functional groups, the weight figures being based on the polymer.

Also embraced by the invention are adhesive tapes, described in accordance with the invention, which have at least one functional layer in direct or indirect vicinity of the carrier layer. Examples of functional layers are layers of coloured coating material, or primers.

The general expression "adhesive tape" encompasses in the sense of this invention all flat structures such as two-dimensionally extended films or film sections, tapes of extended length and limited width, tape sections, labels, diecuts and the like.

Test Methods

Unless indicated otherwise the measurements are conducted under test conditions of 23±1° C. and 50±5% relative humidity.

The density of the polymers is determined in accordance with ISO 1183 and expressed in g/cm³.

The crystallite melting point ($T_{cr}$) is determined by DSC in accordance with MTM 15902 (Basell method) or ISO 3146.

The instantaneous bond strengths are determined with a peel angle of 180° along the lines of AFERA 4001 on test strips which (where possible) are 20 mm wide. In this case, PVC sheets in accordance with the AFERA standard are used as the test substrate, and a strip of the adhesive tape under test is applied to them. A second strip is applied to the reverse face of the first strip, and its bond strength to the reverse face of the first strip is tested in accordance with AFERA 4001.

The release force is determined on a bond formed by two test strips each 20 mm wide. Two strips, 300 mm in length, of a single-sidedly pressure-sensitive adhesive tape are adhered to one another such that subsequently one of the adhesive tapes is adhering with exact congruence on the reverse face of the second adhesive tape. The open adhesive side of the second adhesive tape is lined with a strip of PVC which is 30 μm thick and likewise 20 mm wide. Prior to the measurement, the sample is stored for 7 days at 40° C. with the bond under a weight load of 2 N/cm². Following storage, the test strips are cut to a length of 220 mm and stored under test conditions for two hours. For the measurement, the upper test strip of the bond is clamped into the upper jaws of a tensile testing machine of the kind used in AFERA 4001. The lower test strip and the PVC strip as well are clamped in the lower jaw. The distance between the jaws is 50 mm. Measurement takes place at a rate of 300 mm/min, the speed at which the jaws are moved apart from one another. The average value, determined over a distance of 100 mm, of the force required to part the adhesive bond corresponds to the release force.

The thickness is determined in accordance with DIN 53370, the gauge being planar (not convex). In the case of textured films, however, the relevant thickness is the thickness prior to embossing. This thickness can also be determined subsequently via the weight per unit area (determined in accordance with DIN 53352) with conversion using the density. The embossed depth is the difference between the thicknesses with and without embossing.

The examples below are intended to illustrate the invention without restricting its scope.

EXAMPLE 1

1) Synthesis of the Catalysts for Preparing the Ethylene Multi-Block Copolymer

[N-(2,6-di(1-methylethyl)phenyl)amido](2-isopropylphenyl)(α-naphthalene-2-diyl(6-pyridine-2-diyl)methane)) hafnium dimethyl (catalyst 1) was prepared in accordance with WO 03/040195 A1 and WO 04/024740 A1.

Bis-(1-(2-methylcyclohexyl)ethyl)(2-oxoyl-3,5-di(t-butyl)phenyl)immino)zirconium dibenzyl (catalyst 2) was synthesized as follows:

a) Synthesis of (1-(2-methylcyclohexyl)ethyl)(2-oxoyl-3,5-di(t-butyl)phenyl)imine 2-methylcyclohexylamine (8.44 ml, 64.0 mmol) was dissolved in methanol (90 ml). This solution was admixed with di-t-butylsalicaldehyde (10.00 g, 42.67 mmol) and the solution was stirred for three hours and then cooled to −25° C. for 12 hours. The yellow solid formed was isolated by filtration, washed with cold methanol (2×15 ml) and then dried. The yield was 11.20 g.

b) Synthesis of bis-(1-(2-methylcyclohexyl)ethyl)(2-oxoyl-3,5-di(t-butyl)phenyl)-immino)zirconium dibenzyl A solution of (1-(2-methylcyclohexyl)ethyl)(2-oxoyl-3,5-di(t-butyl)phenyl)imine (7.63 g, 23.2 mmol) in toluene (200 ml) was added slowly to $Zr(CH_2Ph)_4$ (5.28 g, 11.6 mmol) in toluene (600 ml). After an hour at 25° C., toluene (680 ml) was added to give a solution with a concentration of 0.00783 M.

The co-catalyst used was a mixture of methyl-di($C_{14}$-$_{18}$-alkyl)ammonium salts of tetrakis(pentafluorophenyl)borate. These salts were prepared by reacting a long-chain trialkylamine (Armeen™ M2HT, Akzo-Nobel), HCl and Li[B($C_6F_5$)$_4$], substantially as described in U.S. Pat. No. 5,919,983 A1, Example 2.

2) Synthesis of the Ethylene Multi-Block Copolymer

An ethylene multi-block copolymer was prepared by means of chain-shuttling polymerization as follows:

A continuous polymerization in solution was carried out in an autoclave with integrated stirring mechanism. An isoparaffinic hydrocarbon mixture (Isopar™ E from ExxonMobil), ethylene (1.22 kg/hour), 1-octene (1.63 cm³/min) and hydrogen (21.70 cm³/min) were passed into a temperature-controllable reactor (4 l). The inflow of solvent to the reactor and its internal pressure were regulatable. Additionally, catalyst 1 (0.07 kg/hour), catalyst 2 (0.06 kg/hour), cocatalyst (0.13 kg/hour) and diethylzinc (0.25 kg/hour), each in Isopar™ E, were passed into the reactor. The total throughput of Isopar™ E was 11.3 kg/hour. Reagents and catalysts were introduced in the vicinity of the reactor floor. The polymerization was carried out with the reactor completely filled, under a pressure of 3.45 MPa at 120° C., with vigorous stirring. The polymerization product was taken out through ports in the vicinity of the reactor lid. The reaction was halted by addition of a small amount of water and also stabilizers. After the end of the polymerization the reaction mixture was heated and the volatile constituents were removed. The product had a density of 0.883 g/cm³, a melting point of 121° C. and molar masses of $M_w$=118 500 g/mol and $M_n$=53 100 g/mol ($M_w/M_n$=2.2).

3) Production of the Film Web

A film was manufactured by flat film extrusion in a width of 1450 mm. It consisted of a base layer 50 μm thick and an external layer 10 μm thick. The base layer consisted of 91.3% (w/w) of the polypropylene block copolymer Novolen 2309 L (BASF, melt index 6 g/10 min at 230° C. and 2.16 kg, ethylene content approximately 6.5% (w/w)), 8.4% (w/w) of titanium dioxide and 0.3% (w/w) of the HALS stabilizer Tinuvin 770. The external layer consisted of 100% of Infuse ethylene multi-block copolymer (The Dow Chemical Company, d=0.877 g/cm³).

4) Preparation of the Polyacrylate

A 2 l glass reactor conventional for free-radical polymerizations was charged with 40 g of acrylic acid, 360 g of 2-ethylhexyl acrylate and 133 g of acetone/isopropanol (96:4). After nitrogen gas had been passed through the reactor with stirring for 45 minutes, the reactor was heated to 58° C. and 0.2 g of azoisobutyronitrile (AIBN, Vazo 64™, DuPont) was added. Subsequently the external heating bath was heated to 75° C. and the reaction was carried out constantly at this external temperature. After a reaction time of 1 h a further 0.2 g of AIBN was added. After 4 h and 8 h the batch was diluted with 100 g each time of acetone/isopropanol (96:4) mixture. To reduce the residual initiators, 0.6 g each time of bis-(4-tert.-butylcyclohexanyl)peroxydicarbonate (Perkadox 16™, Akzo Nobel) was added after 8 h and after 10 h. The reaction was terminated after a reaction time of 24 h and the product was cooled to room temperature.

Subsequently the polyacrylate was blended with 0.4% by weight of aluminium(III) acetylacetonate (3% strength solution in isopropanol), diluted with isopropanol to a solids content of 30% and then coated from solution onto release paper. After drying at 90° C. for 20 minutes, the coat weight was 50 g/m².

Prior to coating, the carrier material was given a single-sided corona treatment on the side of the film whose surface consisted of base layer polymer. The adhesive was applied to the pretreated side of the carrier material by lamination from coated release paper. Subsequently the release paper was lined again and the adhesive tape was wound up into log rolls.

EXAMPLE 2

A film was manufactured by flat film extrusion in a width of 1450 mm. It consisted of a base layer 50 μm thick and an external layer 10 μm thick. The base layer consisted of 91.3% (w/w) of the polypropylene block copolymer Novolen 2309 L (BASF, melt index 6 g/10 min at 230° C. and 2.16 kg, ethylene content approximately 6.5% (w/w)), 8.4% (w/w) of titanium dioxide and 0.3% (w/w) of the HALS stabilizer Tinuvin 770. The external layer consisted of 100% of Infuse D9107 ethylene multi-block copolymer (The Dow Chemical Company, d=0.866 g/cm³).

Further operation was identical with the process in Example 1.

EXAMPLE 3

A film was manufactured by flat film extrusion in a width of 1450 mm. It consisted of a base layer 50 μm thick and an external layer 10 μm thick. The base layer consisted of 91.3% (w/w) of the polypropylene block copolymer Novolen 2309 L (BASF, melt index 6 g/10 min at 230° C. and 2.16 kg, ethylene content approximately 6.5% (w/w)), 8.4% (w/w) of titanium dioxide and 0.3% (w/w) of the HALS stabilizer Tinuvin 770. The external layer consisted of 85% of Infuse D9107 ethylene multi-block copolymer (The Dow Chemical Company, d=0.866 g/cm³) and 15% of polyethylene LD251 (ExxonMobil, d=0.9155).

Further operation was identical with the process in Example 1.

COMPARATIVE EXAMPLE 1

A film was manufactured by flat film extrusion in a width of 1450 mm. It consisted of a base layer 50 μm thick and an external layer 10 μm thick. The base layer consisted of 91.3% (w/w) of the polypropylene block copolymer Novolen 2309 L (BASF, melt index 6 g/10 min at 230° C. and 2.16 kg, ethylene content approximately 6.5% (w/w)), 8.4% (w/w) of titanium dioxide and 0.3% (w/w) of the HALS stabilizer Tinuvin 770. The external layer consisted of 100% of polyethylene LD252 (ExxonMobil Chemical, PE-LD, d=0.923 g/cm³).

Further operation was identical with the process in Example 1.

COMPARATIVE EXAMPLE 2

A film was manufactured by flat film extrusion in a width of 1450 mm. It consisted of a base layer 50 μm thick and an external layer 10 μm thick. The base layer consisted of 91.3% (w/w) of the polypropylene block copolymer Novolen 2309 L (BASF, melt index 6 g/10 min at 230° C. and 2.16 kg, ethylene content approximately 6.5% (w/w)), 8.4% (w/w) of titanium dioxide and 0.3% (w/w) of the HALS stabilizer Tinuvin 770. The external layer consisted of 100% of polyethylene LL 1030XV (ExxonMobil Chemical, PE-LLD, d=0.918 g/cm³).

Further operation was identical with the process in Example 1.

| Comparison of properties | | |
|---|---|---|
| | Instantaneous bond strength [N/cm] | Release force [N/cm] |
| Example 1 | 5.5 | 1.8 |
| Example 2 | 5.4 | 1.3 |
| Example 3 | 5.4 | 2.1 |
| Comparative Example 1 | 5.4 | 2.7 |
| Comparative Example 2 | 6.1 | 3.4 |

A comparison of the release forces from Examples 1 and 2 with those from the comparative examples makes it clear that the bond strengths of the acrylate adhesive on the films with ethylene multi-block copolymer are far below those of the other external layers. Whereas the instantaneous bond strengths of the examples are often still in the same order of magnitude as those of the comparative examples, the release forces following prolonged storage at elevated temperature in no case attain the level of the comparative examples when an external multi-block copolymer layer is used. The reason for these differences between instantaneous bond strength and release force is a change in the strength of adhesive bonding of the acrylate adhesive to different substrates when the adhesive assembly is stored. Whereas storage is usually accompanied by an increase in the strength of adhesive bonding, this is not true, or is true only to a minor extent, for the adhesive bond on ethylene multi-block copolymer. Accordingly this substrate is particularly suitable for achieving a low unwound force even after storage.

The invention claimed is:

1. A release agent comprising an ethylene multi-block copolymer, the ethylene multi-block copolymer comprising hard segment blocks and soft segment blocks, said hard segment blocks comprising at least 95% (w/w) ethylene and a comonomer, and said soft segment blocks comprising ethylene and a comonomer, wherein the fraction of comonomer in the soft segment blocks is between 10 and 20 mol %, and the fraction of the hard segment blocks in the ethylene multi-block copolymer is not more than 45% (w/w).

2. The release agent according to claim 1, wherein the hard segment blocks have a crystallite melting point of at least 110° C.

3. The release agent according to claim 1 wherein the ethylene multi-block copolymer is produced by chain-shuttling polymerization.

4. The release agent according to claim 1 wherein the comonomer is a $C_3$ to $C_{10}$ olefin.

5. The release agent according to claim 1 wherein the fraction of the hard segment blocks in the ethylene multiblock copolymer is not more than 35% (w/w).

6. The release agent according to claim 4 wherein the comonomer is a $C_8$ olefin.

7. A release film comprising a release agent according to claim 1.

8. An adhesive tape comprising a carrier material, an adhesive provided on one side of the carrier material, and a coherent release layer on a side the carrier material opposite the adhesive, wherein the release layer comprises a release agent according to claim 1.

9. The adhesive tape according to claim 8 wherein the release layer comprises at least 70% by weight of the release agent.

10. The adhesive tape according to claim 8 wherein the adhesive is a pressure sensitive adhesive.

11. The adhesive tape according to claim 10 wherein the pressure sensitive adhesive is an acrylate adhesive.

* * * * *